(12) United States Patent
Billau et al.

(10) Patent No.: US 7,383,555 B2
(45) Date of Patent: Jun. 3, 2008

(54) APPARATUS AND METHOD FOR SHARING A NETWORK I/O ADAPTER BETWEEN LOGICAL PARTITIONS

(75) Inventors: Ronald Leroy Billau, Rochester, MN (US); Charles Scott Graham, Rochester, MN (US); Harvey Gene Kiel, Rochester, MN (US); Chetan Mehta, Austin, TX (US); Lee Anton Sendelbach, Rochester, MN (US); Jaya Srikrishnan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 10/798,914

(22) Filed: Mar. 11, 2004

(65) Prior Publication Data

US 2005/0204366 A1 Sep. 15, 2005

(51) Int. Cl.
*G06F 3/00* (2006.01)
*G06F 9/54* (2006.01)
*G06F 13/36* (2006.01)
*G06F 15/177* (2006.01)

(52) U.S. Cl. .................... 719/327; 719/321; 719/324; 713/1; 713/2; 713/100

(58) Field of Classification Search ........ 719/313–320, 719/321, 324, 327; 713/1, 2, 100
See application file for complete search history.

(56) References Cited

U.S. PATENT DOCUMENTS

| | | | | |
|---|---|---|---|---|
| 5,253,344 A | * | 10/1993 | Bostick et al. | 710/8 |
| 5,414,851 A | * | 5/1995 | Brice et al. | 718/104 |
| 5,630,076 A | * | 5/1997 | Saulpaugh et al. | 710/104 |
| 5,659,756 A | * | 8/1997 | Hefferon et al. | 710/200 |
| 5,659,786 A | * | 8/1997 | George et al. | 713/100 |
| 5,996,026 A | * | 11/1999 | Onodera et al. | 710/3 |
| 6,226,734 B1 | * | 5/2001 | Kleinsorge et al. | 712/13 |
| 6,247,109 B1 | * | 6/2001 | Kleinsorge et al. | 712/13 |
| 6,263,378 B1 | * | 7/2001 | Rudoff et al. | 719/327 |
| 6,279,046 B1 | * | 8/2001 | Armstrong et al. | 710/5 |
| 6,314,501 B1 | | 11/2001 | Gulick et al. | |
| 6,334,154 B1 | | 12/2001 | Gioquindo et al. | |
| 6,393,457 B1 | | 5/2002 | Allison et al. | |
| 6,453,392 B1 | * | 9/2002 | Flynn, Jr. | 711/151 |

(Continued)

FOREIGN PATENT DOCUMENTS

JP 2003008612 A 1/2003

*Primary Examiner*—William Thomson
*Assistant Examiner*—Richard Pantoliano, Jr.
(74) *Attorney, Agent, or Firm*—Martin & Associates (57) ABSTRACT

An I/O adapter sharing mechanism in a logically partitioned computer system allows sharing a network I/O adapter between logical partitions in an efficient manner. A first logical partition owns (or controls) the I/O adapter, and a second logical partition desires to use (or share) the I/O adapter. An I/O adapter device driver that includes a hardware interface is provided in the first logical partition. A virtual device driver is provided in the second logical partition that provides a set of functions that is at least partially defined by querying the I/O adapter device driver in the first logical partition. The I/O adapter sharing mechanism includes a transfer mechanism that allows data to be transferred directly from the virtual device driver in the second logical partition to the I/O adapter without passing through the I/O adapter device driver in the first logical partition.

7 Claims, 6 Drawing Sheets

U.S. PATENT DOCUMENTS

| | | |
|---|---|---|
| 6,473,655 B1 | 10/2002 | Gould et al. |
| 6,530,078 B1 * | 3/2003 | Shmid et al. ............... 717/138 |
| 6,542,926 B2 * | 4/2003 | Zalewski et al. ........... 709/213 |
| 6,647,508 B2 * | 11/2003 | Zalewski et al. .............. 714/3 |
| 6,725,284 B2 * | 4/2004 | Arndt ............................ 710/5 |
| 6,789,126 B1 * | 9/2004 | Saulpaugh et al. ......... 709/245 |
| 6,854,021 B1 * | 2/2005 | Schmidt et al. ................ 710/5 |
| 6,944,847 B2 * | 9/2005 | Desai et al. ................. 717/121 |
| 7,111,303 B2 * | 9/2006 | Macchiano et al. ......... 719/313 |
| 2002/0032850 A1 * | 3/2002 | Kauffman .................... 712/31 |
| 2002/0124152 A1 * | 9/2002 | Arndt ............................ 712/1 |
| 2002/0129126 A1 * | 9/2002 | Chu et al. .................... 709/220 |
| 2004/0255047 A1 * | 12/2004 | Larson et al. ............... 709/249 |

\* cited by examiner

APPARATUS AND METHOD FOR SHARING A NETWORK I/O ADAPTER BETWEEN LOGICAL PARTITIONS

BACKGROUND OF THE INVENTION

1. Technical Field

This invention generally relates to data processing, and more specifically relates to the sharing of resources between logical partitions in a logically partitioned computer system.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The iSeries computer system developed by IBM is an example of a computer system that supports logical partitioning. If logical partitioning on an iSeries computer system is desired, partition manager code (referred to as a "hypervisor" in iSeries terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

A computer system that includes multiple logical partitions typically shares resources between the logical partitions. For example, a computer system with a single CPU could have two logical partitions defined, with 50% of the CPU allocated to each logical partition, with 33% of the memory allocated to the first logical partition and 67% of the memory allocated to the second logical partition, and with two different I/O slots allocated to the two logical partitions, one per partition. Once logical partitions are defined and shared resources are allocated to the logical partitions, each logical partition acts as a separate computer system. Thus, in the example above that has a single computer system with two logical partitions, the two logical partitions will appear for all practical purposes to be two separate and distinct computer systems.

Logical partitions typically communicate using an internal virtual local area network (VLAN). This VLAN implementation simplifies the migration of multiple computer systems into a single computer system with multiple logical partitions. Where the separate computer systems used to communicate over LAN connections, the logical partitions may now communicate in similar manner over their VLAN connections.

When logical partitions share a resource, such as an I/O adapter, one of the logical partitions is typically designated as the "owner" of the resource, and other logical partitions may share the resource by communicating with the logical partition that owns the resource. For the discussion herein, the term "hosting partition" refers to a logical partition that owns a resource, and the term "hosted partition" refers to a logical partition that does not own the resource but that desires to use (or share) the resource by communicating with the hosting partition. When an application in a hosted partition needs to communicate with a shared network I/O adapter in the hosting partition (for example, an Ethernet adapter), the application typically passes a message to its TCP stack, which passes the message to its IP stack, which then communicates the message to the VLAN device driver. The partition manager monitors data buffers in memory that correspond to the VLAN device driver, and when transmit data is present, the partition manager copies the data in the data buffers from hosted partition memory to hosting partition memory. The VLAN device driver on the hosting partition then reads the copied data, and sends the data to an IP forwarding mechanism in the hosting partition. The IP forwarding mechanism then sends the data to the I/O adapter device driver, which communicates the data to its hardware interface. The partition manager then manages the transfer of data from the hardware interface to the I/O adapter, resulting in the data being transmitted to the network connection coupled to the I/O adapter. While this implementation for I/O adapter sharing is very easy to implement, it suffers from serious performance issues, especially as the number of logical partitions sharing the resource increases. Without a way to share an I/O adapter between logical partitions in a more efficient manner, the computer industry will continue to suffer from performance penalties that result from sharing an I/O adapter in a logically partitioned computer system.

DISCLOSURE OF INVENTION

An I/O adapter sharing mechanism in a logically partitioned computer system allows sharing a network I/O adapter between logical partitions in an efficient manner. A first logical partition owns (or controls) the I/O adapter, and a second logical partition desires to use (or share) the I/O adapter. An I/O adapter device driver that includes a hardware interface is provided in the first logical partition. A virtual device driver is provided in the second logical partition that provides a set of functions that is at least partially defined by querying the I/O adapter device driver in the first logical partition. The I/O adapter sharing mechanism includes a transfer mechanism that allows data to be transferred directly from the virtual device driver in the second logical partition to the I/O adapter without passing through the I/O adapter device driver in the first logical partition.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

According to preferred embodiments of the present invention, an I/O adapter sharing mechanism efficiently shares a network I/O adapter between logical partitions. An I/O adapter device driver is provided in a first logical partition that owns or controls the I/O adapter. A virtual device driver is provided in a second logical partition that needs to use (share) the I/O adapter. The virtual device driver includes a set of functions that are at least partially determined by querying the I/O adapter device driver in the first logical partition. In this manner, the virtual device driver can support any advanced hardware functions that the I/O adapter is capable of performing. In addition, the I/O adapter sharing mechanism uses a transfer mechanism to transfer data between the virtual device driver in the second logical partition and the I/O adapter without passing through the I/O adapter device driver in the first logical partition.

Figure 1:
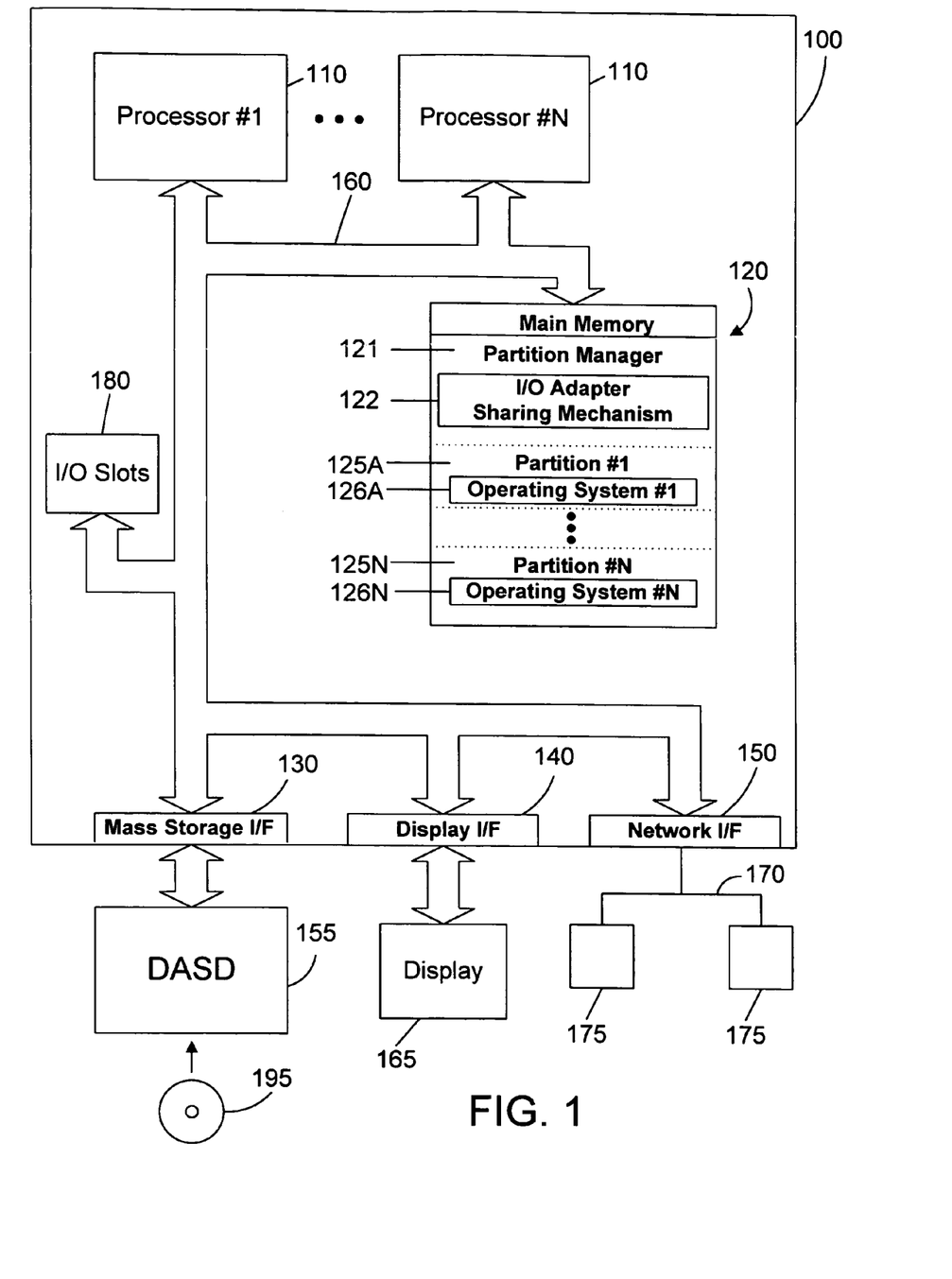
FIG. 1 is a block diagram of a computer apparatus that supports logical partitioning and I/O adapter sharing in accordance with the preferred embodiments.

Referring to FIG. 1, a computer system 100 is an enhanced IBM eServer iSeries computer system, and represents one suitable type of computer system that supports logical partitioning and I/O adapter sharing in accordance with the preferred embodiments. Those skilled in the art will appreciate that the mechanisms and apparatus of the present invention apply equally to any computer system that supports logical partitions. As shown in FIG. 1, computer system 100 comprises one or more processors 110 connected to a main memory 120, a mass storage interface 130, a display interface 140, a network interface 150, and a plurality of I/O slots 180. Note that one or more of mass storage interface 130, display interface 140, and network interface 150 could be embedded I/O on computer system 100. These system components are interconnected through the use of a system bus 160. Mass storage interface 130 is used to connect mass storage devices (such as a direct access storage device 155) to computer system 100. One specific type of direct access storage device is a CD RW drive, which may read data from a CD RW 195. Note that mass storage interface 130, display interface 140, and network interface 150 may actually be implemented in adapters coupled to I/O slots 180. An I/O adapter is one suitable network interface 150 that may be implemented in an external card that is plugged into one of the I/O slots 180.

Main memory 120 contains a partition manager 121 and N logical partitions 125, shown in FIG. 1 as logical partitions 125A through 125N. Partition manager 121 preferably creates these N logical partitions 125. Each logical partition 125 preferably includes a corresponding operating system 126, shown in FIG. 1 as operating systems 126A through 126N.

Figure 5:
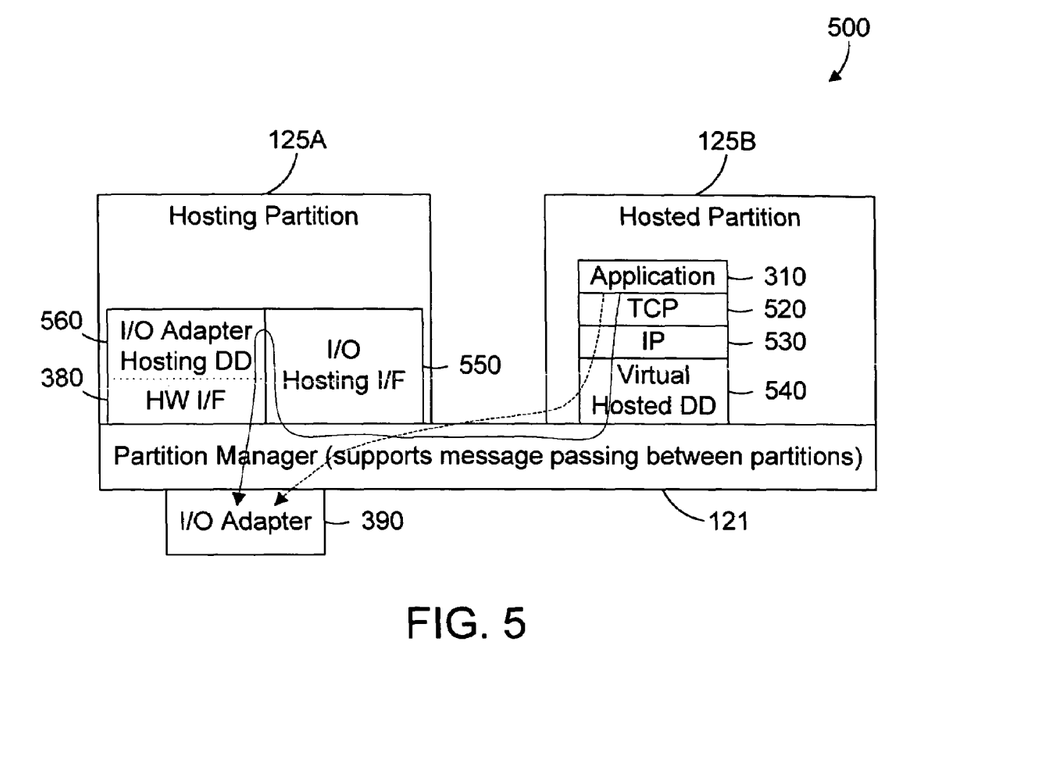
FIG. 5 is a block diagram showing portions of the computer system in FIG. 1 that shares an I/O adapter between logical partitions in accordance with the preferred embodiments.
Figure 6:
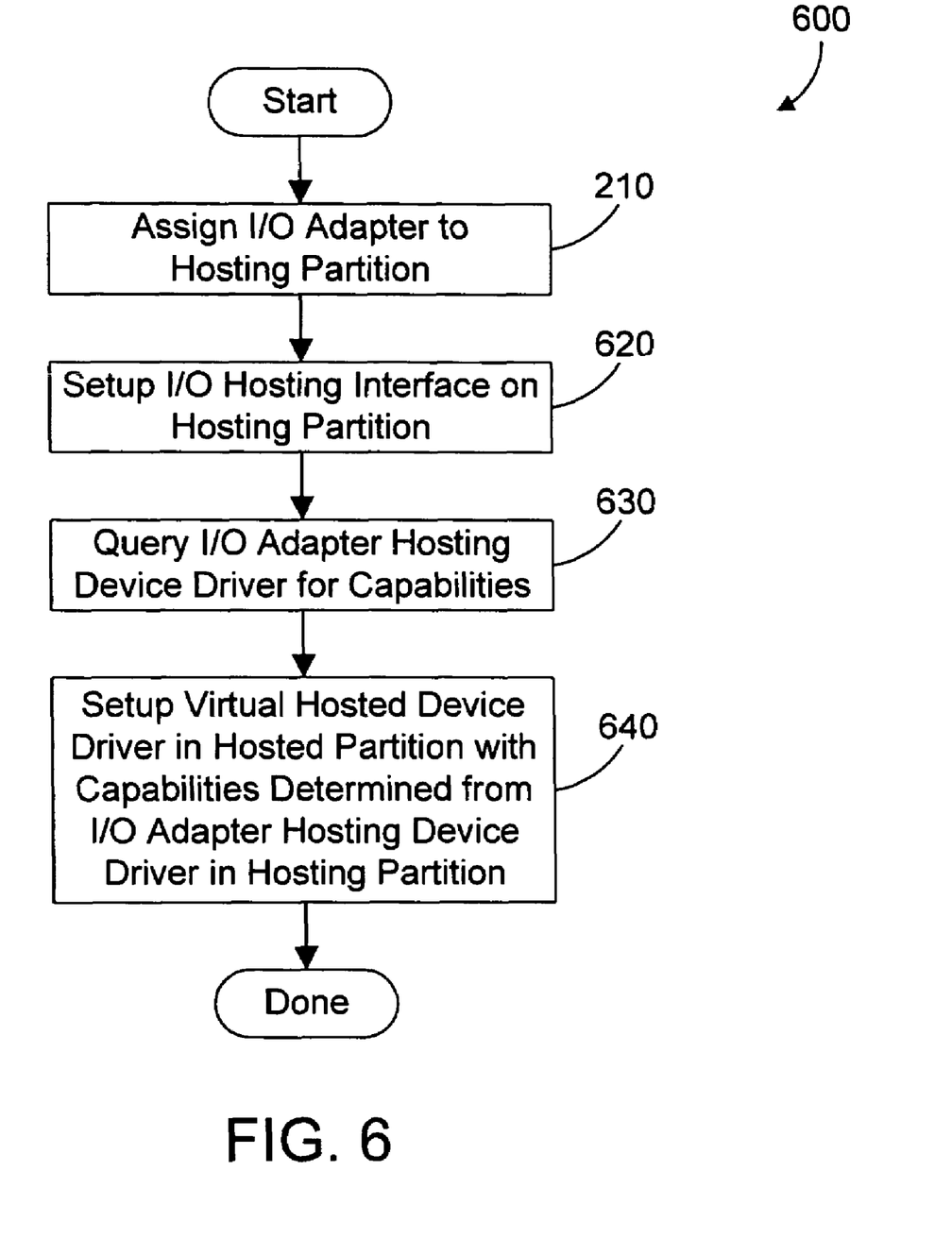
FIG. 6 is a flow diagram of a method in accordance with the preferred embodiments for configuring logical partitions to share an I/O adapter.
Figure 7:
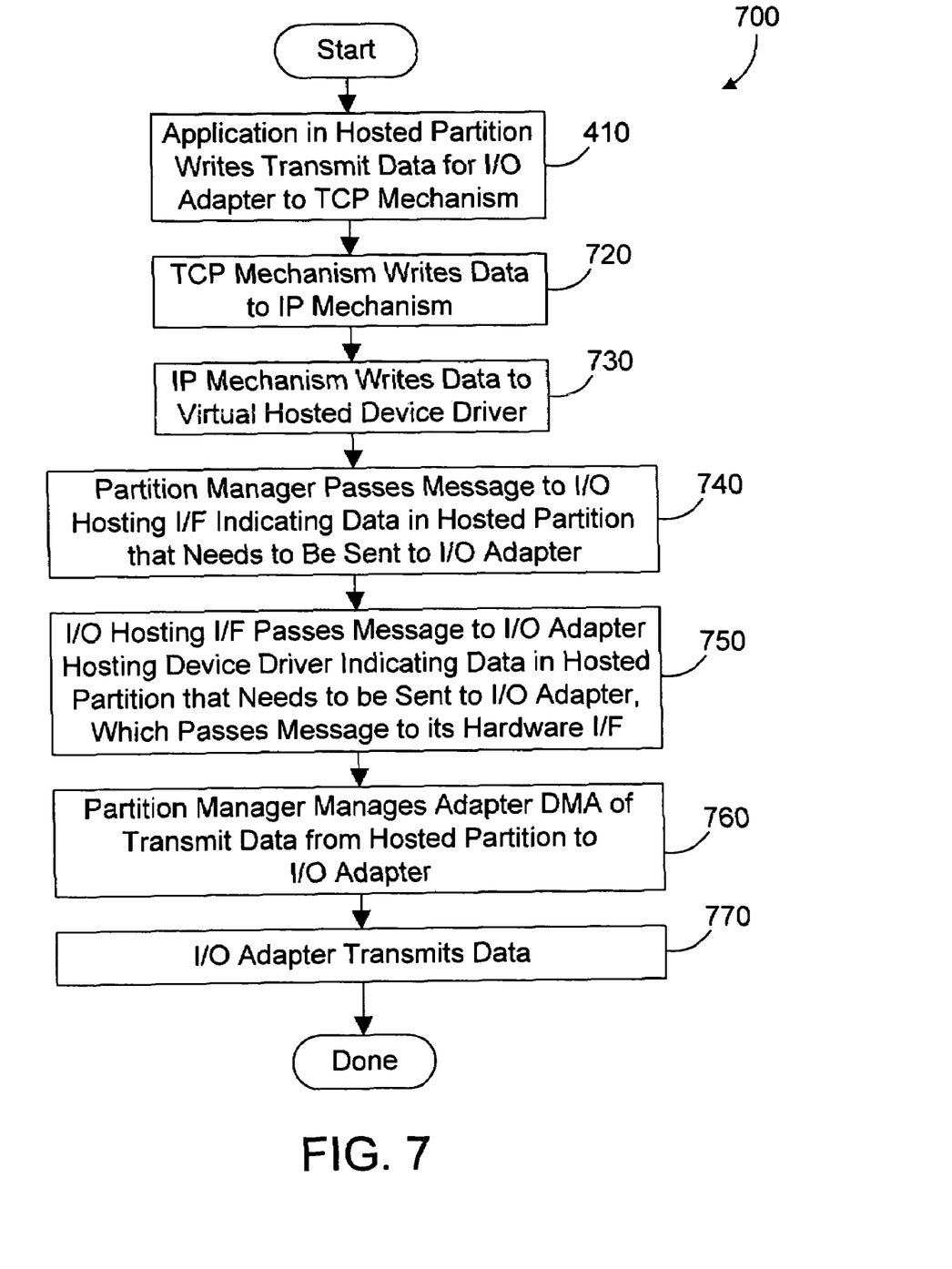
FIG. 7 is a flow diagram of a method in accordance with the preferred embodiments for sharing the I/O adapter in the computer system shown in FIG. 5.

Partition manager 121 includes an I/O adapter sharing mechanism 122 that efficiently shares an I/O adapter between logical partitions. While the I/O adapter sharing mechanism 122 is shown in FIG. 1 to reside in main memory 120, one skilled in the art will appreciate that I/O adapter sharing mechanism preferably includes different pieces that reside within the logical partitions 125 and within the partition manager 121, and that sharing of an I/O adapter of the preferred embodiments occurs through cooperation of these different pieces, as shown in FIGS. 5-7, which are discussed in more detail below.

Operating system 126 is a multitasking operating system, such as OS/400, AIX, or Linux; however, those skilled in the art will appreciate that the spirit and scope of the present invention is not limited to any one operating system. Any suitable operating system can be used. Operating system 126 is a sophisticated program that contains low-level code to manage the resources of computer system 100. Some of these resources are processor 110, main memory 120, mass storage interface 130, display interface 140, network interface 150, system bus 160, and I/O slots 180. The operating system 126 in each partition may be the same as the operating system in other partitions, or may be a completely different operating system. Thus, one partition can run the OS/400 operating system, while a different partition can run another instance of OS/400, possibly a different release, or with different environment settings (e.g., time zone or language). The operating systems in the logical partitions could even be different than OS/400, provided it is compatible with the hardware (such as AIX or Linux). In this manner the logical partitions can provide completely different computing environments on the same physical computer system.

The partitions 125A-125N are shown in FIG. 1 to reside within the main memory 120. However, one skilled in the art will recognize that a partition is a logical construct that includes resources other than memory. A logical partition typically specifies a portion of memory, along with an assignment of processor capacity and other system resources, such as I/O slots 180 (and I/O adapters, which may reside in I/O slots 180). Thus, one partition could be defined to include two processors and a portion of memory 120, along with one or more embedded I/O that can provide the functions of mass storage interface 130, display interface 140, network interface 150, or interfaces to I/O adapters or other devices plugged into I/O slots 180. Another partition could then be defined to include three other processors, a different portion of memory 120, one or more embedded I/O, and I/O slots 180. The partitions are shown in FIG. 1 to symbolically represent logical partitions, which would include system resources outside of memory 120 within computer system 100. Note also that the partition manager 121 preferably resides in memory and hardware separate from the logical partitions and includes facilities and mechanisms that are not directly available to the logical partitions.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while partition manager 121 and the partitions 125A-125N are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up the partition manager 121, which initializes the operating systems in the logical partitions.

Although computer system 100 is shown to contain only a single system bus, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor 110, as in iSeries input/output processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD RW (e.g., 195 of FIG. 1), and transmission type media such as digital and analog communications links.

Figure 2:
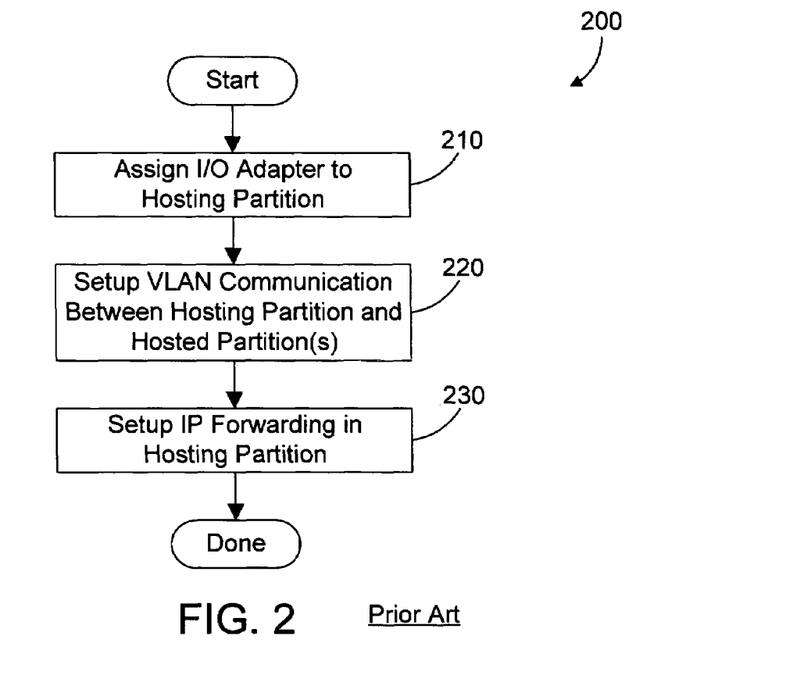
FIG. 2 is a flow diagram of a prior art method for configuring logical partitions to share an I/O adapter.

A detailed discussion of prior art I/O network adapter sharing is now presented, which provides a context for discussing the I/O adapter sharing in accordance with the preferred embodiments. Referring to FIG. 2, a method 200 represents steps that are taken in the prior art to prepare two logical partitions to share an I/O adapter. The I/O adapter is assigned to a logical partition (step 210), which is called a "hosting partition" because it is the owner (or host) of the I/O adapter. Internal VLAN communication is then set up between the hosting partition and any partition (hosted partition) that wants to use (share) the I/O adapter in the hosting partition (step 220). IP forwarding is then setup in the hosting partition (step 230). Note that the individual steps in method 200 may be performed at any time before the logical partitions may share the I/O adapter at run-time, including when the logical partitions are created and defined, when the logical partitions are first brought up and executed, or at run-time. In the most preferred implementation, the I/O adapter is assigned to the hosting partition in step 210 during partition configuration, the VLAN communication setup in step 220 is performed when the logical partitions are loaded and are preparing to be run, and the IP forwarding setup in step 230 is performed after the logical partitions are running.

Figure 3:
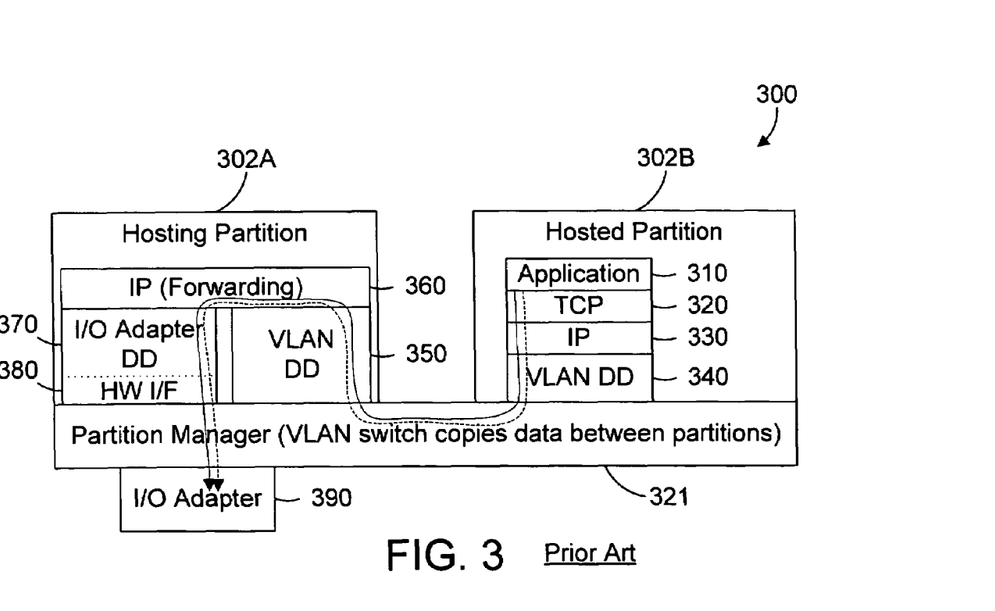
FIG. 3 is a block diagram showing portions of a prior art logically partitioned computer system that shares an I/O adapter between logical partitions.

A block diagram of certain logical elements in a prior art logically partitioned computer system 300 is shown in FIG. 3. The hosting partition 302A and hosted partition 302B are controlled by a partition manager 321. The hosted partition 302B includes one or more applications 310, a TCP mechanism 320, an IP mechanism 330, and a virtual LAN (VLAN) device driver 340. The hosting partition 302A includes a VLAN device driver 350, an IP forwarding mechanism 360, and an I/O adapter device driver 370 that includes a hardware interface 380. Note that hosting partition 302A would normally include a TCP layer that is not shown because the TCP layer in the hosting partition 302A is not used to transmit data to a shared I/O adapter. The hosting partition 302A and hosted partition 302B communicate via the partition manager 321 and VLAN. Note also that the partition manager 321 manages the transfer of data between the hardware interface 380 and the I/O adapter 390.

We see from correlating FIGS. 2 and 3 that step 220 in FIG. 2 installs the VLAN device driver 340 in the hosted partition 302B, installs the VLAN device driver 350 in the hosting partition 302A, and enables VLAN communications within the partition manager 321. Step 230 in FIG. 2 installs and enables the IP forwarding mechanism 360 in the hosting partition 302A so that data received by VLAN device driver 350 that is intended for the I/O adapter 390 is forwarded to the I/O adapter device driver 370.

Figure 4:
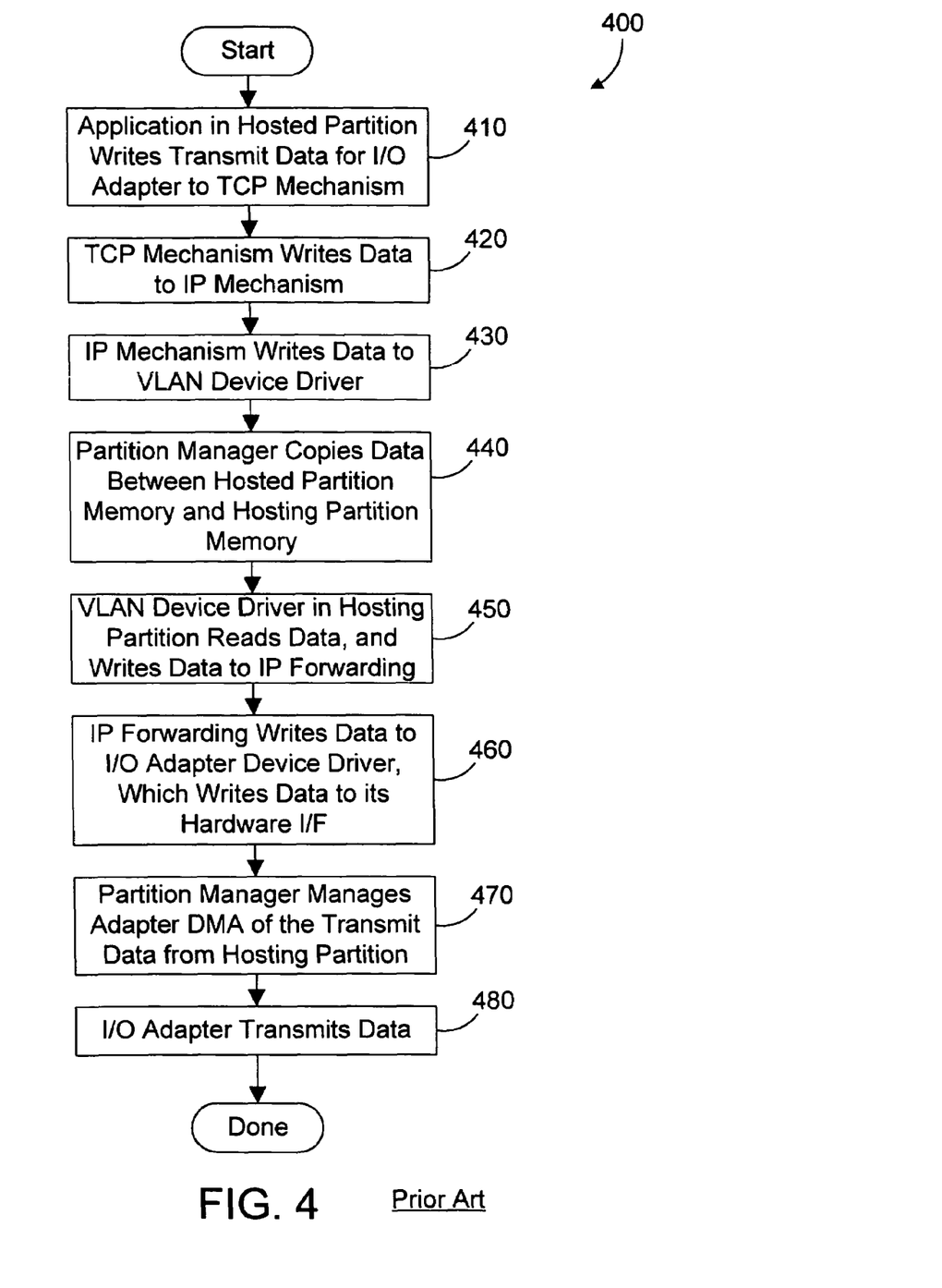
FIG. 4 is a flow diagram of a prior art method for sharing the I/O adapter in the computer system shown in FIG. 3.

Referring to FIG. 4, a prior art method 400 shows the steps for the hosted partition 302B in FIG. 3 to share the I/O adapter 390. Method 400 represents the steps that are performed at run-time when data needs to be transferred between an application 310 in the hosted partition 302B and the I/O adapter 390. Note that the steps in method 400 are best understood by also referring to FIG. 3. First, the application 310 in the hosted partition 302B writes transmit data for the I/O adapter 390 to its TCP mechanism 320 (step 410). The TCP mechanism 320 formats the data into frames, adds a TCP checksum, and writes the data to the IP mechanism 330 (step 420). The IP mechanism 330 then adds an IP checksum, and writes the data to the VLAN device driver 340 (step 430). The partition manager then copies the data between memory in the hosted partition 302B and memory in hosting partition 302A (step 440). The VLAN device driver 350 in the hosting partition 302A then reads the data, determines the data needs to be processed by the IP layer, and in this case by the IP forwarding mechanism 360 (step 450). The IP forwarding mechanism then forwards the data to the I/O adapter device driver 370, which writes the data to its hardware interface 380 (step 460). The partition manager 321 then manages the direct memory access (DMA) of the transmit data by the I/O adapter 390 from memory in the hosting partition 302A to the I/O adapter 390 (step 470). The I/O adapter then transmits the data (step 480). For the sake of simplicity, method 400 relates to the transfer of data from an application 310 in the hosted partition 302B to the I/O adapter 390 for transmission. One skilled in the art will appreciate that transfers from the I/O adapter 390 to the application 310 occur in similar fashion in a reverse order.

There are several problems with the prior art method for sharing an I/O adapter between logical partitions shown in FIGS. 2-4. First, the data path shown as the dotted line between the application 310 and the I/O adapter 390 follows the same path as the control message path, shown as the solid line. As a result, all data to be communicated between application 310 and I/O adapter 390 has to go through three device drivers (VLAN in hosted partition, VLAN in hosting partition and I/O adapter) instead of going through a single device driver (I/O adapter) when the I/O adapter is dedicated. In addition, data is copied between VLAN device drivers by the partition manager, resulting in an extra data copy. The prior art method also requires two IP levels, increasing overhead. The result is that shared I/O adapters in the prior art have performance levels that are significantly lower than for dedicated I/O adapters.

Another significant disadvantage is that the hosted partition cannot take advantage of any hardware enhancements present on the I/O adapter, because an application that uses TCP/IP and VLAN device driver 340 has no knowledge of the capabilities of the I/O adapter 390. Most current Ethernet adapters support TCP and IP "checksum offload." This means that the I/O adapter 390 itself may be configured to generate the checksums for the TCP and IP messages, thereby relieving the software of the overhead of generating checksums at the TCP and IP layers. When an I/O adapter that supports checksum offload is used in a dedicated manner, the I/O adapter can be configured to generate the checksums for TCP and IP messages, which can improve performance of the system because no CPU cycles are required to generate the checksums. However, when the same I/O adapter that supports checksum offload is used in a shared manner as shown in FIG. 3, the hosted TCP and IP layers have no way of knowing that the I/O adapter 390 has this capability. As a result, this checksum offload capability cannot be used by any hosted partitions. Note that this capability may be used by the hosting partition, but not by any of the hosted partitions.

Another advanced adapter function provided by some 1 gigabit-per-second (Gbps) Ethernet adapters is known as "large frame send." With this feature enabled, the I/O adapter may process transmit frames that are as large as 64 Kbytes. The adapter splits a 64 Kbyte frame into 1,500 byte frames, including the appropriate TCP and IP headers. In the prior art, 1,500 byte frames are normally used. It is evident that the sending of 64 Kbyte frames is more efficient than the sending of an equivalent number of 1,500 byte frames, because each frame requires checksum processing. In the prior art, more context switching occurs between hosted and hosting partitions for 1,500 byte frames than if 64 Kbyte frames could be used. The large frame send capability of some I/O adapters could significantly enhance performance, but this capability will go unused in all hosted partitions. Again, because the hosted partitions have no way to determine the capability of the I/O adapter, they must assume that no advanced functions are present.

Yet another advanced adapter function supported on some known Ethernet adapters is known as "IPsec", which is an encryption standard for TCP/IP and UDP sessions. Like the other advanced adapter functions, this function is unavailable to hosted partitions. Still another advanced adapter function that is planned for future Ethernet adapters is known as TCP/IP Offload Engine, or TOE. This allows TCP and IP processing to be done directly on the adapter, relieving the computer system from the CPU cycles that are normally required to perform TCP and IP processing. Again, this advanced adapter function is unavailable to hosted partitions using the prior art method for sharing an I/O adapter between logical partitions.

Another disadvantage of the prior art method for sharing an I/O adapter between logical partitions is that IP forwarding configuration is complex and error-prone. The hosting partition must have IP forwarding turned on and configured properly in order to share the I/O adapter. All of these disadvantages in the prior art method for sharing an I/O adapter are not present in the method of the preferred embodiments, which is discussed in detail below.

While FIG. 1 shows a sample computer system that includes some of the salient features of both hardware and software in accordance with the preferred embodiments, a more detailed logical view of some of the components in FIG. 1 is shown as system 500 in FIG. 5. The VLAN device drivers in the prior art are replaced by an I/O hosting interface 550 in the hosting partition 125A and a virtual hosted device driver 540 in the hosted partition 125B. The I/O hosting interface 550 and virtual hosted device driver 540 communicate with each other when data needs to be transferred between the application 310 and the I/O adapter 390. One of the significant functions provided by the I/O hosting interface 550 is the ability for the virtual hosted device driver 540 to query the I/O adapter hosting device driver 560 to determine what functions are supported by the I/O adapter 390. The virtual hosted device driver 540 thus includes a set of functions that are at least partially determined by the functions available in the I/O adapter hosting device driver. One suitable way to configure the virtual hosted device driver 540 is to query the I/O adapter hosting device driver 560 for its available functions. Of course, other methods of communicating the available functions of the I/O adapter hosting device driver 560 to the virtual hosted device driver 540 are within the scope of the preferred embodiments. For example, a configuration table or file in the partition manager could be written that contains the available functions for the I/O adapter hosting device driver, and this table or file could be read to determine available functions for the virtual hosted device driver.

Because the virtual hosted device driver 540 has a set of functions that are determined by the available functions of the I/O adapter hosting device driver 560, hosting partitions may now take advantage of any performance enhancement offered by the I/O adapter, including checksum offload, large frame send, IPsec, TOE, etc. As a result, the transmit data for application 310 may take advantage of all the advanced features of I/O adapter 390, even though I/O adapter 390 is being shared with hosting partition 125A. Thus, if we assume that I/O adapter 390 supports checksum offload and large frame send, and that these features are enabled on the I/O adapter 390 and within the virtual hosted device driver 540, the TCP mechanism 520 does not have to generate a checksum, and may construct a frame as large as 64 Kbytes instead of 1,500 byte frames. In addition, the IP mechanism 530 does not have to generate a checksum. The advanced features of the I/O adapter 390 may thus be used by the hosted partitions that share the I/O adapter 390.

Another significant advantage of system 500 in FIG. 5 is that data may have a shortened path compared to the path for control messages. The path for control messages is shown as a solid line, while the path for data is shown as a dotted line. When the application 310 needs to send data to the I/O adapter 390, a message is written by application 310 to TCP mechanism 520, which constructs a frame and sends the frame to IP mechanism 530. The IP mechanism 530 then sends the frame to the virtual hosted device driver 540. A suitable message is then written to the I/O hosting interface 550. We assume this message includes pointers to a list of buffers within the hosted partition 125B that contain the data to be transmitted. This message is then written by the I/O hosting interface 550 to the I/O adapter hosting device driver 560, which writes the message to its hardware interface 380. We assume for this example that the message specifies the location in memory in the hosted partition where the data was written by the virtual hosted device driver 540. In response, the partition manager 121 preferably manages the transfer of data using redirected remote DMA directly from the memory in the hosted partition that contains the data to the I/O adapter 390, shown by the dotted line. In the prior art, an I/O adapter only has DMA access to memory in the logical partition that owns the I/O adapter. In the preferred embodiments, however, the partition manager may setup additional address translation entries and authentication capability to allow the I/O adapter DMA access to memory within the hosted partition 125B. Note that the dotted data path shows data being transferred from the virtual hosted device driver 540 to the I/O adapter 390. Note, however, that the data need not reside within the virtual hosted device driver, but may reside in any portion of memory within the hosted partition 125B that may be accessed by the virtual hosted device driver 540 and that may be accessed by a redirected remote DMA operation. This means that prior art I/O adapters can be used to take advantage of the advantages of the preferred embodiments without requiring any enhancements, because the I/O adapter DMA operation from memory in the hosted partition 302B is the same type of operation as a DMA operation from memory in the hosting partition 302A.

Referring to FIG. 6, a method 600 in accordance with the preferred embodiments for setting up I/O adapter sharing between logical partitions begins by assigning an I/O adapter to a hosting partition (step 210). The I/O hosting interface on the hosting partition is then setup (step 620). The I/O adapter hosting device driver is then queried to determine the capabilities of the I/O adapter (step 630). The virtual hosted device driver in the hosted partition is then installed with capabilities (i.e., a set of functions) that may be, in part, determined by the query in step 630 (step 640). In this manner the virtual hosted device driver may be configured to support any advanced features available on the I/O adapter, thereby making these advanced features available to the hosted partitions. At this point method 600 is done, and the logical partitions are ready to be run.

Referring to FIG. 7, a method 700 in accordance with the preferred embodiments shows steps that are preferably performed at run-time to share the I/O adapter of FIG. 5 that is owned (or controlled) by the hosting partition 125A with the hosted partition 125B. When the application 310 in the hosted partition 125B needs to transfer data to the I/O adapter 390, it starts by writing the transmit data to the TCP mechanism 520 (step 410). The TCP mechanism 520 then writes the data to the IP mechanism 530 (step 720). The IP mechanism 530 the writes the data to the virtual hosted device driver 540 (step 730). The virtual hosted device driver 540 then sends a message to the I/O hosting interface 550 that indicates that data in the hosted partition 125B needs to be sent to the I/O adapter (step 740). This message preferably identifies a location within the memory of the hosted partition 125B where the data to be transferred is located. The virtual hosted device driver 540 and I/O hosting interface 550 are preferably designed to minimize context switching between partitions, thereby enhancing system performance. The I/O hosting interface 550 passes the message to the I/O adapter hosting device driver 560, which passes the message to its hardware interface 380 (step 750). The partition manager then reads the message from the hardware interface 380 and manages the direct DMA of the data from the hosted partition 125B to the I/O adapter 390 (step 760). The I/O adapter 390 then transmits the data 780 to the network connection to which it is connected (step 770).

Method 700 assumes data needs to be transferred from the application 310 to the I/O adapter 390 in FIG. 5. Method 700 results in significant performance enhancement in transmitting data to I/O adapter 390. In the case of the I/O adapter receiving data that needs to be written to the hosted partition, the performance enhancement is not as significant. We assume there are data receive buffers in memory in the hosting partition 125A. When data is received by the I/O adapter, it is written to the data buffers in the hosting partition. An interrupt then occurs, which notifies the I/O adapter hosting device driver 560 that data has been received. The data is passed to the I/O hosting interface 550, which uses the partition manager 121 to pass the data to the virtual hosted device driver 540 in the appropriate logical partition. The virtual hosted device driver then passes the data to the IP mechanism 530, then to the TCP mechanism 520, and finally to the application 310. Because the improvement in receiving data by the shared I/O adapter 390 is not nearly as significant as the improvement in transmitting data, the receive case is not discussed further. Note, however, that computer system servers typically transmit substantially more data than they receive.

The preferred embodiments provide a significant advance over the prior art by providing virtual device drivers in each hosted partition that may reflect advanced functions provided by the I/O adapter. As a result, advanced functions such as checksum offload, large frame send, IPsec, and TOE may be used by hosted partitions, significantly enhancing the performance of communications with the I/O adapter for these hosted partitions. These virtual device drivers are much smaller and simpler than a device driver for a physical I/O adapter, because virtual device drivers do not require a hardware interface, do not require low-level adapter management, and do not require extensive error recovery functions. In addition, the message protocol between the virtual hosted device driver and the I/O hosting mechanism allows identifying transmit data within the hosted logical partition that may be directly transferred to the I/O adapter without passing through the I/O adapter hosting device driver. The result is a significant improvement in system performance when sharing an I/O adapter between logical partitions.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer-implemented method for sharing a shared network I/O adapter between first and second logical partitions on a computer apparatus, the method comprising the steps of:
   (A) providing an I/O adapter device driver in the first logical partition, the I/O adapter device driver including a hardware interface to the shared network I/O adapter;

(B) determining a plurality of functions provided by the shared network I/O adapter by querying the I/O adapter device driver for its available functions;

(C) providing a virtual device driver in the second logical partition, the virtual device driver providing a set of functions at least partially determined by the plurality of functions determined in step (B); and (D) a partition manager that communicates between the first and second logical partitions controlling exchange of information between the virtual device driver and the I/O adapter device driver.

2. The method of claim 1 further comprising the step of transferring data between the virtual device driver and the shared network I/O adapter without the data passing through the I/O adapter device driver.

3. A computer-implemented method for sharing a shared network I/O adapter between first and second logical partitions on a computer apparatus, the method comprising the steps of:

(A) defining the first and second logical partitions, the first logical partition controlling the shared network I/O adapter and the second logical partition using the shared network I/O adapter controlled by the first logical partition, the first logical partition comprising an I/O adapter device driver that includes a hardware interface to the shared network I/O adapter, the second logical partition comprising a virtual device driver that receives data to be sent to the shared network I/O adapter and data received from the shared network I/O adapter;

(B) determining a plurality of functions provided by the shared network I/O adapter by querying the I/O adapter device driver for its available functions;

(C) providing a set of functions for the virtual device driver that is at least partially determined by the plurality of functions determined in step (B); and (D) a partition manager that communicates between the first and second logical partitions communicating between the virtual device driver and the I/O adapter device driver.

4. The method of claim 3 further comprising the step of transferring data between the virtual device driver and the network I/O adapter without the data passing through the I/O adapter device driver.

5. A computer-implemented method for sharing a shared network I/O adapter between first and second logical partitions on a computer apparatus, the method comprising the steps of:

(A) defining the first and second logical partitions on the apparatus, the first logical partition controlling the shared network I/O adapter and the second logical partition using the shared network I/O adapter controlled by the first logical partition;

(B) providing an I/O adapter device driver in the first logical partition, the I/O adapter device driver including a hardware interface to the shared network I/O adapter;

(C) providing a virtual device driver in the second logical partition, the virtual device driver providing a set of functions at least partially determined from querying the I/O adapter device driver in the first logical partition for its available functions; and (D) a partition manager that communicates between the first and second logical partitions communicating between the virtual device driver in the second logical partition and the I/O adapter device driver in the first logical partition.

6. The method of claim 5 further comprising the step of transferring data between the virtual device driver and the shared network I/O adapter without the data passing through the I/O adapter device driver.

7. A computer-implemented method for sharing a shared network I/O adapter between first and second logical partitions on a computer apparatus, the method comprising the steps of:

(A) defining the first and second logical partitions on the apparatus, the first logical partition controlling a shared network I/O adapter and the second logical partition using the shared network I/O adapter controlled by the first logical partition;

(B) providing a partition manager that performs the steps of:

(B1) querying an I/O adapter device driver in the first logical partition for its available functions;

(B2) providing a virtual device driver in the second logical partition with a set of functions at least partially determined from the available functions determined in step (B1);

(B3) receiving at least one transmit message from the virtual device driver in the second logical partition;

(B4) sending at least one transmit message to the I/O adapter device driver in the first logical partition that includes a hardware interface to the shared network I/O adapter; and (B5) transferring data from the virtual device driver in the second logical partition to the shared network I/O adapter without the data passing through the I/O adapter device driver in the first logical partition.

* * * * *